US009207090B2

(12) United States Patent
Cheng et al.

(10) Patent No.: US 9,207,090 B2
(45) Date of Patent: Dec. 8, 2015

(54) SYSTEM AND METHOD FOR DYNAMIC PATH OPTIMIZATION

(71) Applicants: Yu Cheng, Shanghai (CN); Mengjiao Wang, Shanghai (CN); Wen-Syan Li, Fremont, CA (US)

(72) Inventors: Yu Cheng, Shanghai (CN); Mengjiao Wang, Shanghai (CN); Wen-Syan Li, Fremont, CA (US)

(73) Assignee: SAP SE, Walldorf (DE)

(*) Notice: Subject to any disclaimer, the term of this patent is extended or adjusted under 35 U.S.C. 154(b) by 183 days.

(21) Appl. No.: 14/056,701

(22) Filed: Oct. 17, 2013

(65) Prior Publication Data

US 2015/0088417 A1  Mar. 26, 2015

(30) Foreign Application Priority Data

Sep. 26, 2013 (CN) .......................... 2013 1 0445546

(51) Int. Cl.
*G01C 21/00* (2006.01)
*G01C 21/34* (2006.01)

(52) U.S. Cl.
CPC .................................. *G01C 21/3492* (2013.01)

(58) Field of Classification Search
CPC ................................................. G01C 21/3492
See application file for complete search history.

(56) References Cited

U.S. PATENT DOCUMENTS

| 2007/0106465 | A1* | 5/2007 | Adam et al. | 701/209 |
| 2008/0234927 | A1* | 9/2008 | O'Neill | 701/204 |
| 2011/0288765 | A1* | 11/2011 | Conway | 701/201 |
| 2012/0265436 | A1* | 10/2012 | Tkachenko | 701/438 |

* cited by examiner

*Primary Examiner* — Mary Cheung
(74) *Attorney, Agent, or Firm* — Schwegman Lundberg & Woessner, P.A.

(57) ABSTRACT

Techniques of dynamic path optimization are disclosed. In some embodiments, a method comprises receiving an instruction to determine an optimal path from a source geographical location to a destination geographical location, and determining an optimal path from the source geographical location to the destination geographical location using corresponding historical traffic information for each one of a plurality of sub-paths. The historical traffic information for each sub-path may correspond to an estimated arrival time at a start location for the corresponding sub-path and be used to select sub-paths from the plurality of sub-paths. The selected sub-paths may define the optimal path. In some embodiments, the historical traffic information comprises an indication of traffic flow for the corresponding sub-path. In some embodiments, the indication of traffic flow comprises an average speed of traffic flow.

15 Claims, 9 Drawing Sheets

SYSTEM AND METHOD FOR DYNAMIC PATH OPTIMIZATION

CLAIM OF PRIORITY

The present patent application claims the priority benefit of the filing date of Chinese Application (SIPO) No. 201310445546.3 filed Sep. 26, 2013, the entire content of which is incorporated herein by reference.

TECHNICAL FIELD

The present application relates generally to the technical field of data processing, and, in various embodiments, to methods and systems of dynamic path optimization.

BACKGROUND

Path optimization plays an important role in various applications, such as logistics execution, network routing protocols, and aircraft trajectory optimization. However, complications often arise in the real world.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Example methods and systems of dynamic path optimization are disclosed. In the following description, for purposes of explanation, numerous specific details are set forth in order to provide a thorough understanding of example embodiments. It will be evident, however, to one skilled in the art that the present embodiments may be practiced without these specific details.

Several difficulties may be met in the real-world path optimization, including, but not limited to, traffic flow being dynamic and varied on all roads, traffic jams being time-based, traffic restrictions being found during a certain time period in stipulated region, and speed restrictions being found in stipulated road sections.

Figure 1:
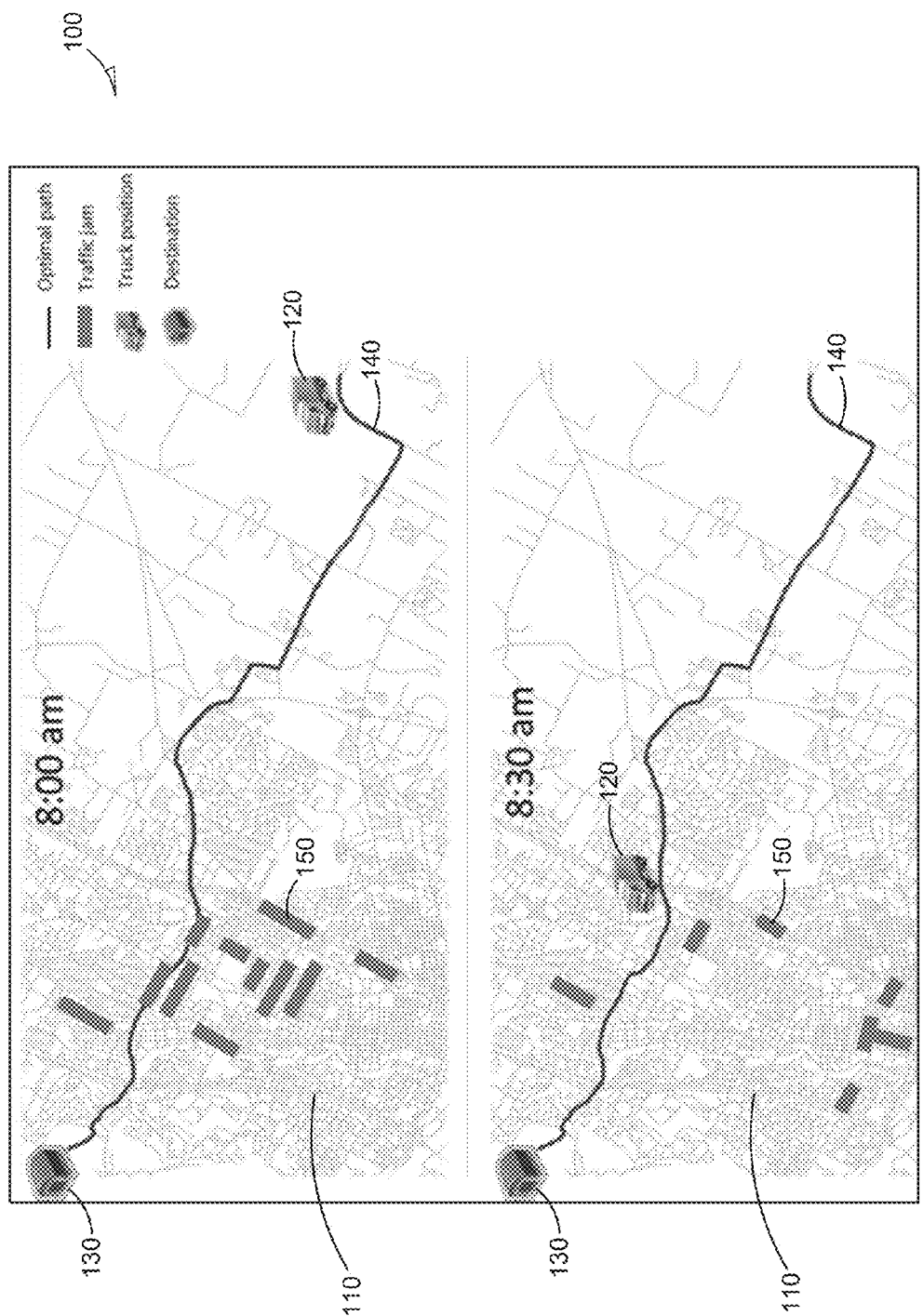
FIG. 1 illustrates a logistics execution example reflecting real world complications with path optimization on a map, in accordance with an example embodiment.

In an example involving logistics execution, trucks are expected to deliver cargo to destinations quickly. FIG. 1 illustrates a logistics execution example 100 reflecting real world complications with path optimization on a map 110, in accordance with an example embodiment. In the example 100, a path 140 is determined at 8:00 am for a delivery truck 120 to travel from an origin location to a destination location 130. As shown, when the path 140 is determined at 8:00 am, this determination is based on one or more traffic conditions that are particular to the time at which the path 140 is determined, such as the existence of traffic jams 150. However, these traffic conditions might change by the time the delivery truck reaches the location of their occurrence. For example, although a traffic jam 150 may be happening in a certain region ten kilometers away from the origin location when the path 140 is determined at 8:00 am while the delivery truck is still at the origin location, by the time the truck would probably arrive at that region (e.g., 8:30 am in FIG. 1), the traffic jam 150 may have cleared or have been reduced. Current path optimization solutions do not account for this time-based change in traffic conditions.

The complex problem of path optimization may be broken into sub-problems. In each sub-problem, a timestamp can be obtained to reflect a vehicle's expected arrival time, thereby transforming the dynamic traffic information into static information at the corresponding road sections. A dynamic programming method may be employed to optimize total cost with dynamic traffic information. This dynamic approach can include any combination of the following features, which will be discussed in further detail later in this disclosure:

Data Collection: Historical information of travel flow (e.g., average speed), road distances, and traffic restrictions can be collected and imported into a database.

Optimization: The problem can be divided into several stages, with a policy decision required at each stage.

Optimal Policy: Minimal cost can be evaluated at each stage according to the minimal cost from a source node to the current node (immediate cost) and the minimal forthcoming cost (future cost). The cost can be set in a wide variety, including, but not limited to, distance, travel time, pay expenses, etc.

Timestamp: Timestamp can be granted to the current node with minimal cost from source.

In some embodiments, a path optimization system employs a dynamic evaluation of time cost. Different from conventional static path optimization methods, techniques of the present disclosure can evaluate time cost according to real-time traffic information.

In some embodiments, a method comprises receiving an instruction to determine an optimal path from a source geographical location to a destination geographical location, and determining an optimal path from the source geographical location to the destination geographical location using corresponding historical traffic information for each one of a plurality of sub-paths. The historical traffic information for each sub-path may correspond to an estimated arrival time at a start location for the corresponding sub-path and be used to select sub-paths from the plurality of sub-paths. The selected sub-paths may define the optimal path.

In some embodiments, the historical traffic information comprises an indication of traffic flow for the corresponding sub-path. In some embodiments, the indication of traffic flow comprises an average speed of traffic flow. In some embodiments, the historical traffic information further comprises an indication of availability for the corresponding sub-path.

In some embodiments, each selected sub-path is selected based on a preference to minimize travel time. In some embodiments, determining the optimal path comprises associating each one of a plurality of nodes with a corresponding one of a plurality of geographical locations. The plurality of geographical locations may comprise the source geographical location, the destination geographical location, a start location for each sub-path, and an end location for each sub-path. Neighbor nodes from the plurality of nodes may be determined for a current node of the plurality of nodes. Each neighbor node may be connected to the current node via a corresponding sub-path. A corresponding time cost for traveling to each of the neighbor nodes via the corresponding sub-path may be estimated based on the corresponding historical traffic information at the estimated arrival time for the current node. One of the neighbor nodes and the corresponding sub-path may be selected to be included in the optimal path. The current node may be updated to be equal to the selected neighbor node. The determining, estimating, selecting, and updating steps may be repeated until the current node equals the corresponding node of the destination geographical location.

In some embodiments, information about the optimal path is caused to be displayed to a user on a device. In some embodiments, the information about the optimal path comprises at least one of a time cost for the optimal path, an estimated arrival time at the destination geographical location using the optimal path, and the selected sub-paths for the optimal path.

The methods or embodiments disclosed herein may be implemented as a computer system having one or more modules (e.g., hardware modules or software modules). Such modules may be executed by one or more processors of the computer system. In some embodiments, a non-transitory machine-readable storage device may store a set of instructions that, when executed by at least one processor, causes the at least one processor to perform the operations and method steps discussed within the present disclosure.

Figure 2:
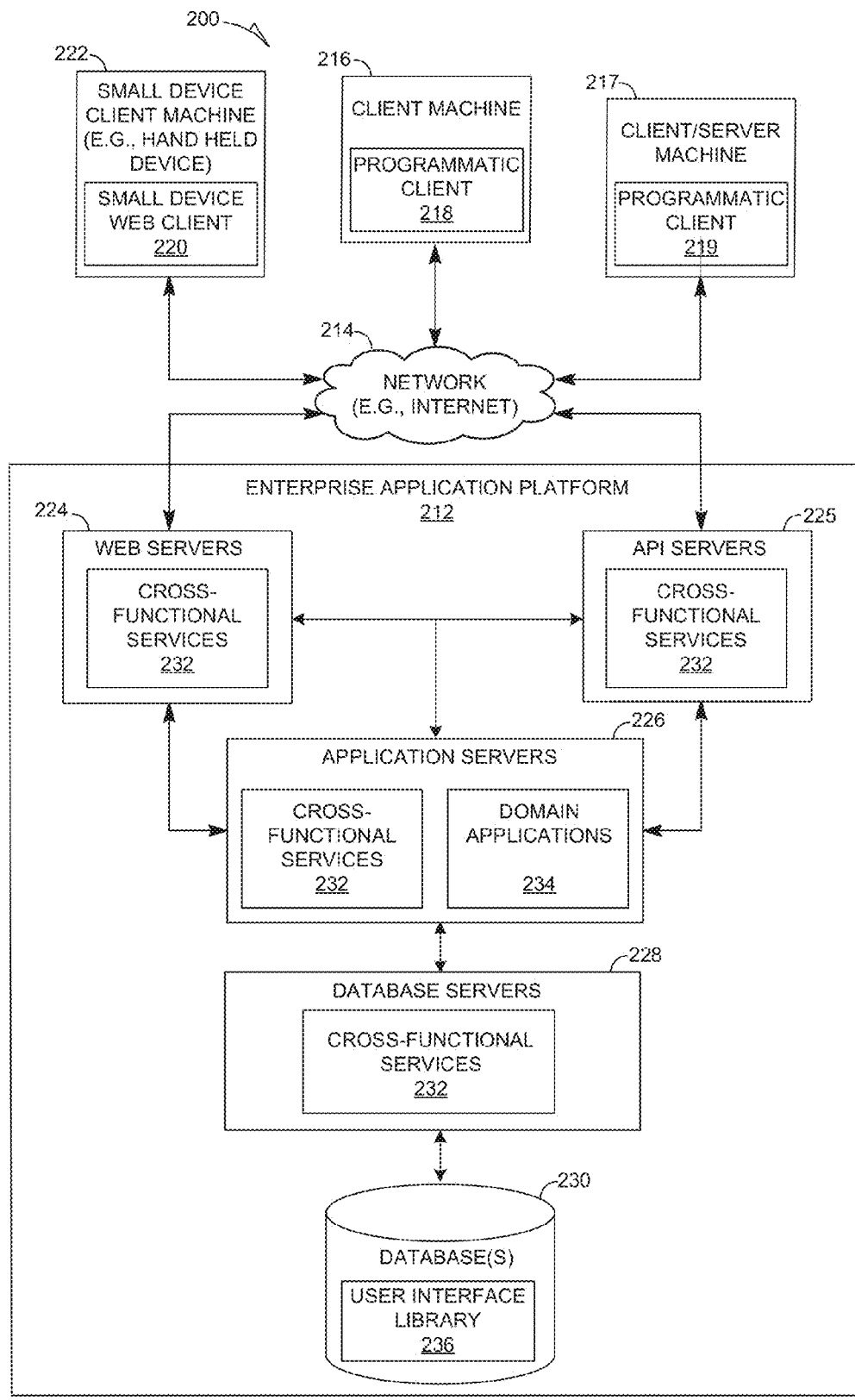
FIG. 2 is a network diagram illustrating a client-server system, in accordance with an example embodiment.

FIG. 2 is a network diagram illustrating a client-server system, in accordance with an example embodiment. A platform (e.g., machines and software), in the example form of an enterprise application platform 212, provides server-side functionality, via a network 214 (e.g., the Internet) to one or more clients. FIG. 2 illustrates, for example, a client machine 216 with programmatic client 218 (e.g., a browser, such as the INTERNET EXPLORER browser developed by Microsoft Corporation of Redmond, Wash. State), a small device client machine 222 with a small device web client 220 (e.g., a browser without a script engine), and a client/server machine 217 with a programmatic client 219.

Turning specifically to the example enterprise application platform 212, web servers 224 and Application Program Interface (API) servers 225 may be coupled to, and provide web and programmatic interfaces to, application servers 226. The application servers 226 may be, in turn, coupled to one or more database servers 228 that facilitate access to one or more databases 230. The web servers 224, Application Program Interface (API) servers 225, application servers 226, and database servers 228 may host cross-functional services 232. The application servers 226 may further host domain applications 234.

The cross-functional services 232 provide services to users and processes that utilize the enterprise application platform 212. For instance, the cross-functional services 232 may provide portal services (e.g., web services), database services and connectivity to the domain applications 234 for users that operate the client machine 216, the client/server machine 217 and the small device client machine 222. In addition, the cross-functional services 232 may provide an environment for delivering enhancements to existing applications and for integrating third-party and legacy applications with existing cross-functional services 232 and domain applications 234. Further, while the system 200 shown in FIG. 2 employs a client-server architecture, the embodiments of the present invention are of course not limited to such an architecture, and could equally well find application in a distributed, or peer-to-peer, architecture system.

Figure 3:
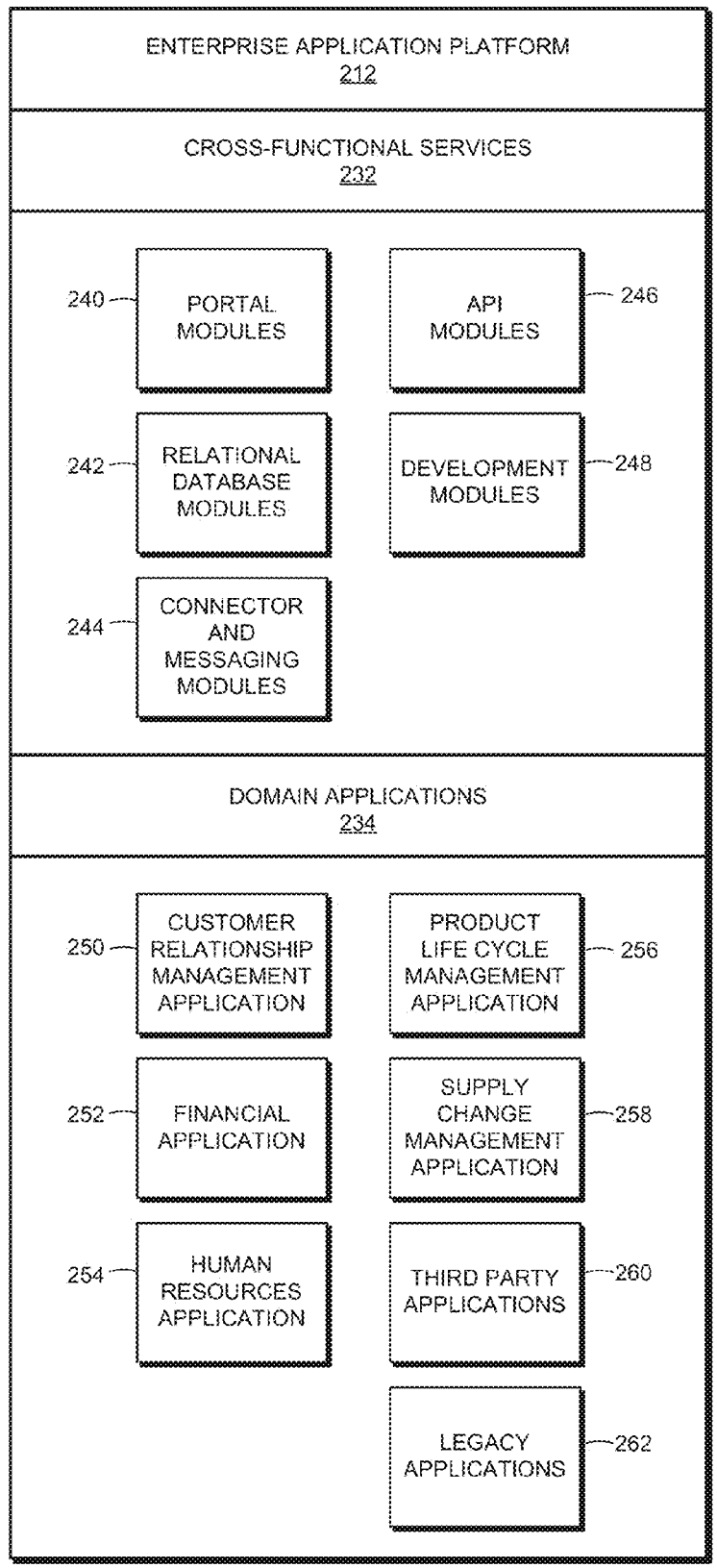
FIG. 3 is a block diagram illustrating enterprise applications and services in an enterprise application platform, in accordance with an example embodiment.

FIG. 3 is a block diagram illustrating enterprise applications and services in an enterprise application platform 212, in accordance with an example embodiment. The enterprise application platform 212 may include cross-functional services 232 and domain applications 234. The cross-functional services 232 may include portal modules 240, relational database modules 242, connector and messaging modules 244, Application Program Interface (API) modules 246, and development modules 248.

The portal modules 240 may enable a single point of access to other cross-functional services 232 and domain applications 234 for the client machine 216, the small device client machine 222, and the client/server machine 217. The portal modules 240 may be utilized to process, author and maintain web pages that present content (e.g., user interface elements and navigational controls) to the user. In addition, the portal modules 240 may enable user roles, a construct that associates a role with a specialized environment that is utilized by a user to execute tasks, utilize services and exchange information with other users and within a defined scope. For example, the role may determine the content that is available to the user and the activities that the user may perform. The portal modules 240 include a generation module, a communication module, a receiving module and a regenerating module. In addition the portal modules 240 may comply with web services standards and/or utilize a variety of Internet technologies including Java, Java 2 Platform Enterprise Edition, SAP's Advanced Business Application Programming Language (ABAP) and Web Dynpro, Extensible Markup Language (XML), Java Cryptography Architecture, Java Authentication and Authorization Service, X.509, Lightweight Directory Access Protocol, Web Service Definition Language, WebSphere Service Registry and Repository, Simple Object Access Protocol, Universal Description Discovery and Integration, and Microsoft.NET.

The relational database modules 242 may provide support services for access to the database(s) 230, which includes a user interface library 236. The relational database modules 242 may provide support for object relational mapping, database independence and distributed computing. The relational database modules 242 may be utilized to add, delete, update and manage database elements. In addition, the relational database modules 242 may comply with database standards and/or utilize a variety of database technologies including Structured Query Language (SQL), Structured Query Language Database Connectivity, Oracle, MySQL, Unicode, Java Database Connectivity.

The connector and messaging modules 244 may enable communication across different types of messaging systems that are utilized by the cross-functional services 232 and the domain applications 234 by providing a common messaging application processing interface. The connector and messaging modules 244 may enable asynchronous communication on the enterprise application platform 212.

The Application Program Interface (API) modules 246 may enable the development of service-based applications by exposing an interface to existing and new applications as services. Repositories may be included in the platform as a central place to find available services when building applications.

The development modules 248 may provide a development environment for the addition, integration, updating and extension of software components on the enterprise application platform 212 without impacting existing cross-functional services 232 and domain applications 234.

Turning to the domain applications 234, the customer relationship management application 250 may enable access to and may facilitate collecting and storing of relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize the financial applications 252 and business processes to track and control financial transactions within the enterprise application platform 212. The financial applications 252 may facilitate the execution of operational, analytical and collaborative tasks that are associated with financial management. Specifically, the financial applications 252 may enable the performance of tasks related to financial accountability, planning, forecasting, and managing the cost of finance.

The human resource applications 254 may be utilized by enterprise personnel and business processes to manage, deploy, and track enterprise personnel. Specifically, the human resource applications 254 may enable the analysis of human resource issues and facilitate human resource decisions based on real time information.

The product life cycle management applications 256 may enable the management of a product throughout the life cycle of the product. For example, the product life cycle management applications 256 may enable collaborative engineering, custom product development, project management, asset management and quality management among business partners.

The supply chain management applications 258 may enable monitoring of performances that are observed in supply chains. The supply chain management applications 258 may facilitate adherence to production plans and on-time delivery of products and services.

The third-party applications 260, as well as legacy applications 262, may be integrated with domain applications 234 and utilize cross-functional services 232 on the enterprise application platform 212.

Figure 4:
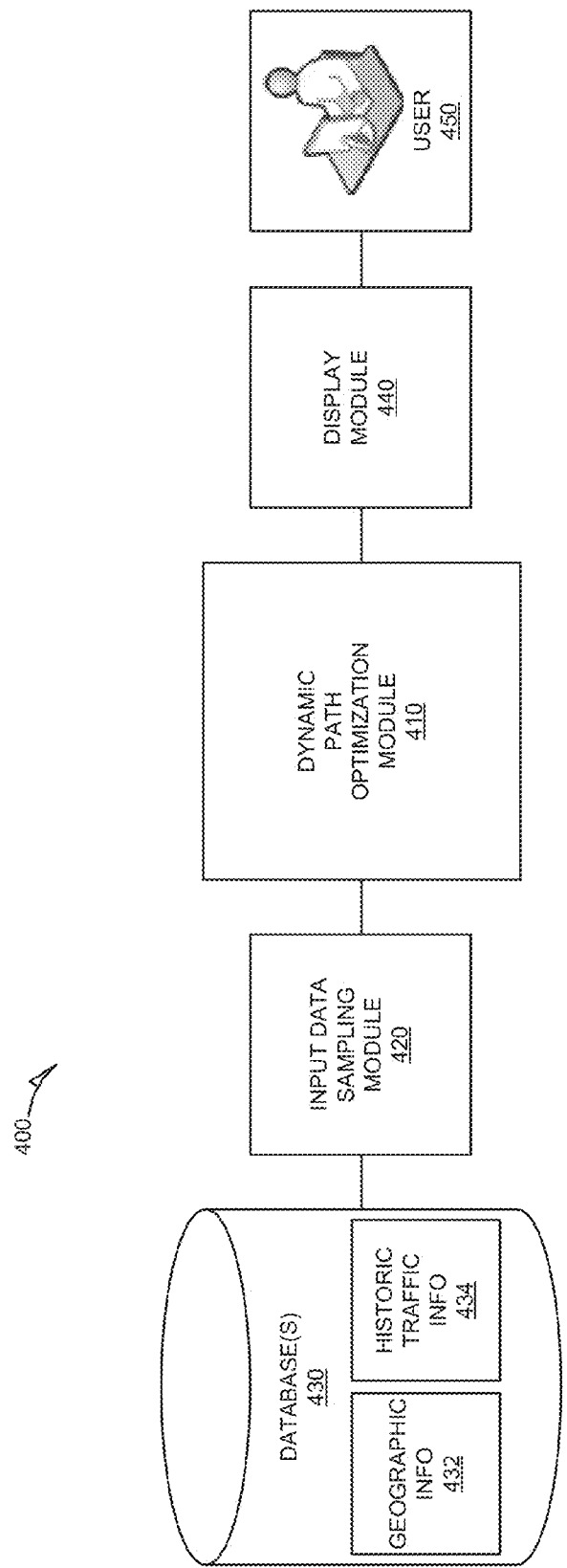
FIG. 4 is a block diagram illustrating a dynamic path optimization system, in accordance with an example embodiment.

FIG. 4 is a block diagram illustrating a dynamic path optimization system 400, in accordance with an example embodiment. Dynamic path optimization system 400 may comprise a dynamic path optimization module 410. In some embodiments, the dynamic path optimization module 410 can be incorporated into the enterprise application platform 212 in FIG. 2 (e.g., on application server(s) 226). However, it is contemplated that other configurations are also within the scope of the present disclosure.

Dynamic path optimization module 410 can be configured to receive one or more instructions to determine an optimal path from a source geographical location to a destination geographical location. The instruction(s) may be initiated or provided by a user 450 on a device (e.g., any of machines 216, 217, 222 in FIG. 2).

Dynamic path optimization module 410 can be configured to determine an optimal path from the source geographical location to the destination geographical location using geographic information 432, which may indicate a plurality of sub-paths that may be selected to form the optimal path, and corresponding historical traffic information 434 for each one of a plurality of sub-paths. Sub-paths may comprise roads or portions of roads connecting two geographic points or nodes. Geographic information 432 and historical traffic information 434 can be stored on one or more databases 430. In some embodiments, database(s) 430 may be incorporated into the database(s) 230 in FIG. 2. However, it is contemplated that other configurations are also within the scope of the present disclosure.

Geographic information 432 may comprise information describing nodes and road allocation. Examples of geographic information 432 include, but are not limited to, the following:

Source Node: Origin location of the path being determined (e.g., the location from where the delivery truck departs).

Destination Node: Destination location of the path being determined (e.g., the location to where the delivery truck is to arrive at the completion of its journey).

Start Node ID: Intermediate start node ID on the path between the source node and the destination node; corresponding start location for each sub-path.

End Node ID: Intermediate end node ID on the path between the source node and the destination node; corresponding end location for each sub-path.

Road Distance: Road sector distance between neighbor start node and end node pair.

In some embodiments, the geographic information 432 can be obtained from or include one or more maps. In some embodiments, the end node is associated with the start node, which is a neighbor of and connected directly to the end node. In some embodiments, no other nodes are allowed in the start node and end node pair connection. In some embodiments, the source node and destination node can be fixed.

In some embodiments, historical traffic information 434 comprises time-based information about traffic flow and restrictions. Historical traffic information 434 can be obtained from historical records (e.g., from historical records collected or maintained by government entities). Examples of historical traffic information 434 include, but are not limited to, the following:

Road Name/ID: The unique name or ID of a road section (sub-path).

Time Period: The time period of records (e.g., 9:00~9:30).

Traffic Flow: A measurement indicating the flow of traffic for the corresponding road section (e.g., average speed of traffic flow, average number of vehicles on road section).

Traffic Restriction: Indication of availability of corresponding road section; e.g., if construction is being performed and road section is closed off, road section can be deemed unavailable for the optimal path; in some embodiments, a value of 1 is used to denote a restriction and a value of 0 is used to denote no restriction.

Speed Restriction: The maximum allowed speed (e.g., speed limit) for the corresponding road section.

Among the listed attributes, the traffic information is provided with respect to a particular road section between any two neighbor nodes. In some embodiments, only the nodes with traffic monitors are sampled, while the nearby less-important nodes are considered with the same information in the road sections. In some embodiments, all the traffic information provided above is associated with roads or road sections between nodes, rather than with a certain node.

Referring back to FIG. 4, an input data sampling module 420 may be used to sample and preprocess the geographic information 432 and the historical traffic information 434 from database(s) 430. The input data sampling module 420 may provide the geographic information 432 and the historical traffic information 434 to the dynamic path optimization module 410, which can then use the geographic information 432 and the historical traffic information 434 to determine the optimal path.

The dynamic path optimization module 410 may cause information regarding the optimal path to be displayed to the user 450 via a display module 440. In some embodiments, the display module 440 can be incorporated into a device of the user 450. The optimal path and details regarding the optimal path can be displayed to the user 450 in a user-friendly way.

In some embodiments, the dynamic path optimization module 410 can output a path table having a sequence of nodes, as well as the total time cost of the determined optimal path. The path table can include, but is not limited to, the following information:
  Node ID: Intermediate nodes on the determined path from the source location to the destination location.
  Timestamp: Arrival time at each node.
  Time Cost: Time cost of each sub-path (e.g., road section) between each neighboring pair of nodes.
The path table can be used to show all the experienced nodes in an optimal path. In contrast to conventional methods, here a timestamp can be used to output the expected arriving time associated to the node in a path. Additionally, the path table can also able to record the optimal solution of a divided sub-problem at each stage of the larger problem. In other words, experienced nodes in the path table can be generated stage by stage.

In some embodiments, the dynamic path optimization module 410 can determine the optimal path using any of the following optimization methods, or combinations thereof.

Figure 5:
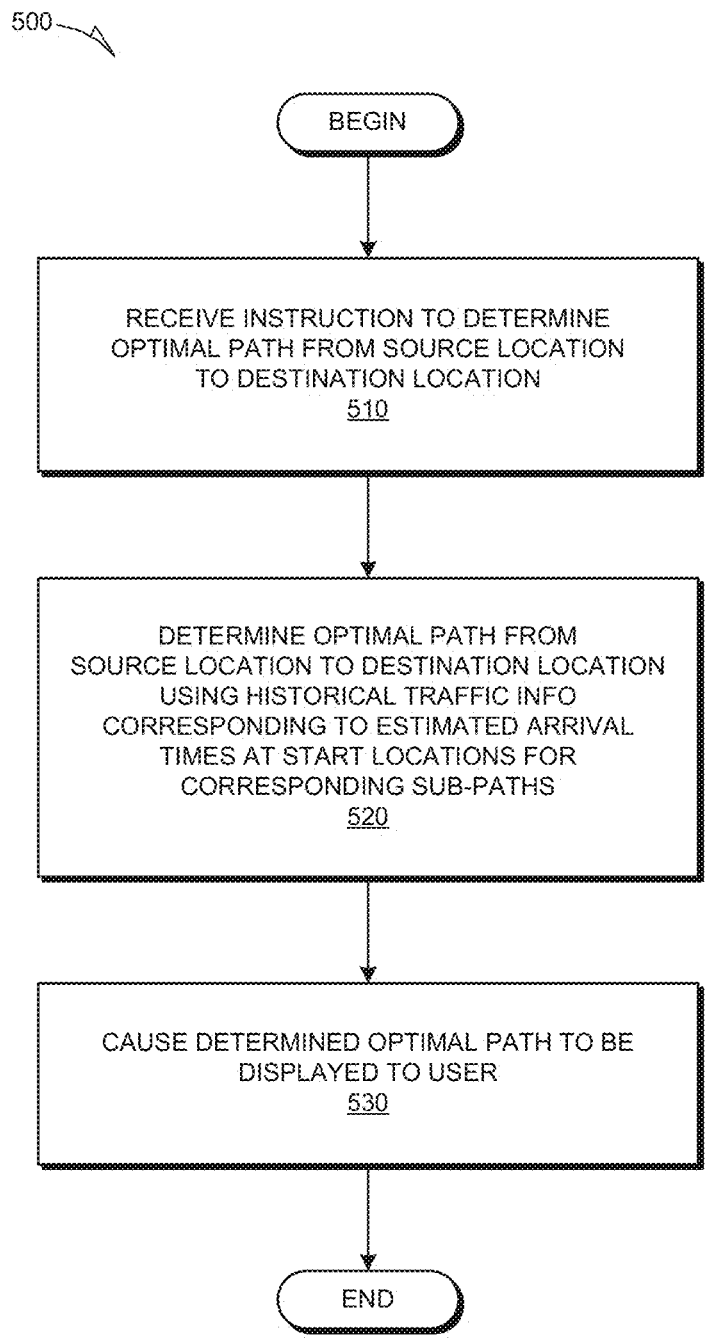
FIG. 5 is a flowchart illustrating a method of determining an optimal path, in accordance with an example embodiment.

FIG. 5 is a flowchart illustrating a method 500 of determining an optimal path, in accordance with an example embodiment. It is contemplated that the operations of method 500 may be performed by a system or modules of a system (e.g., dynamic path optimization module 410 in FIG. 4). At operation 510, an instruction to determine an optimal path from a source geographical location to a destination geographical location may be received. At operation 520, an optimal path from the source geographical location to the destination geographical location may be determined using corresponding historical traffic information for each one of a plurality of sub-paths. The sub-paths may correspond to road sections. The historical traffic information for each sub-path may correspond to an estimated arrival time at a start location for the corresponding sub-path and be used to select sub-paths from the plurality of sub-paths. The selected sub-paths may define the optimal path. At operation 530, the determined optimal path, or details thereof, may be caused to be displayed to a user. It is contemplated that any of the other features described within the present disclosure may be incorporated into method 500.

In some embodiments, nodes can be employed to represent connection points for sub-paths or road sections. Nodes can be denoted as $v_i$, i=1, 2, . . . , N, where N is the number of nodes. The distance between node $v_i$ and $v_j$ can be denoted as $d_{i,j}$. The cost between two neighbor nodes $v_i$ and $v_j$ can be evaluated as a time cost between these two nodes (e.g., the estimated amount of time to travel from $v_i$ to $v_j$). If the traffic flow at time t is expressed as average speed traffic flow $s_{i,j,t}$, the cost can be evaluated as $$c_{i,j,t} = \frac{d_{i,j}}{\min(s_{i,j,t}, r_{i,j,t})}, \tag{1}$$

where $r_{i,j,t}$ is the speed restriction between $v_i$ and $v_j$ at time t. If a traffic restriction is given between $v_i$ and $v_j$ at t, $c_{i,j,t}$ is set to infinite.

Another important index can be the minimal cost from source node $v_1$ to $v_i$, which can be denoted as $f_i$, and the objective may be to generate the minimal cost $f_N$ from source node $v_1$ to destination $v_N$.

Figure 6:
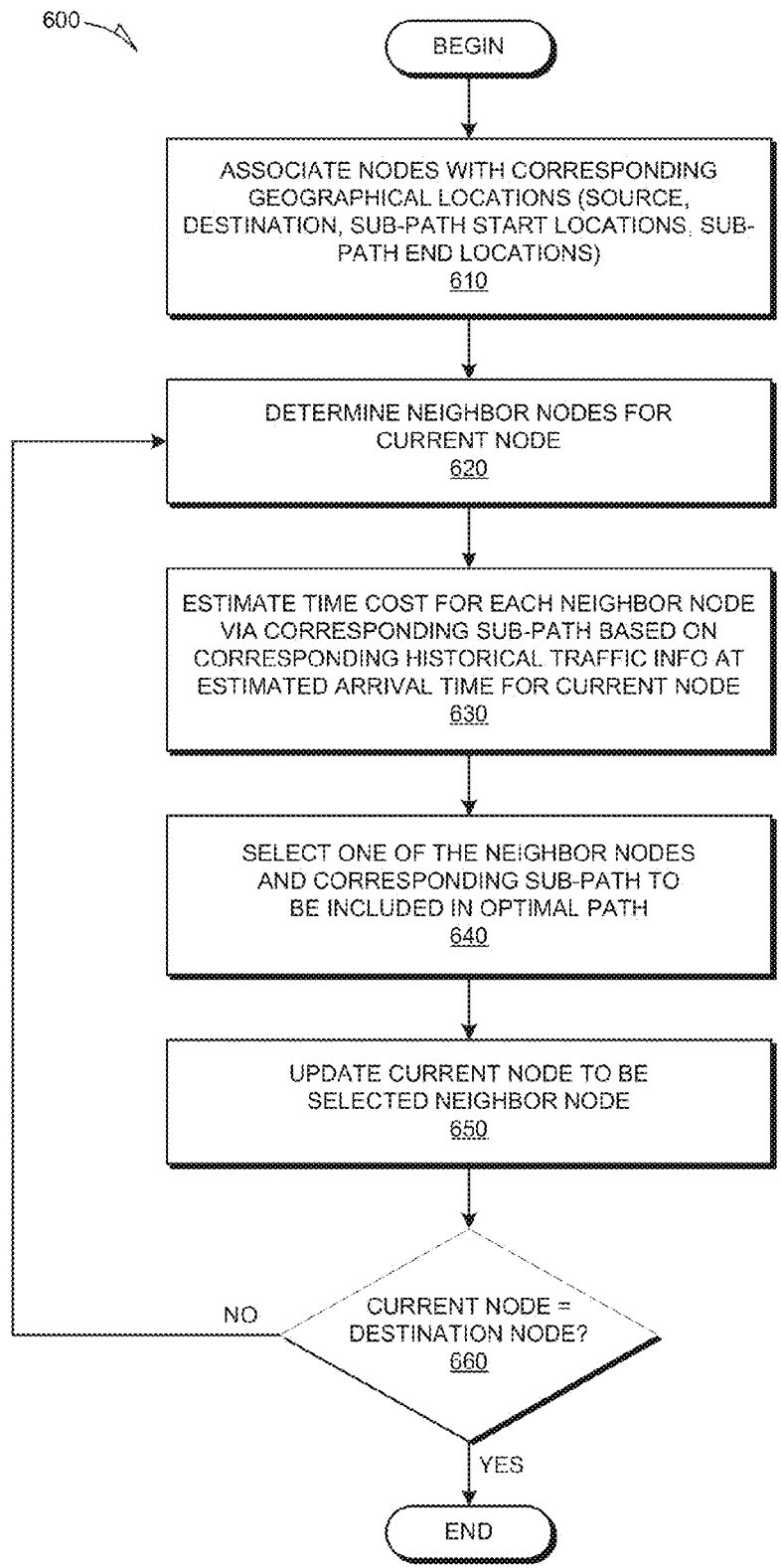
FIG. 6 is a flowchart illustrating a method of determining an optimal path, in accordance with an example embodiment.

FIG. 6 is a flowchart illustrating a method 600 of determining an optimal path, in accordance with an example embodiment. It is contemplated that the operations of method 600 may be performed by a system or modules of a system (e.g., dynamic path optimization module 410 in FIG. 4).

At operation 610, each one of a plurality of nodes may be associated with a corresponding one of a plurality of geographical locations. The plurality of geographical locations may comprise the source geographical location, the destination geographical location, a start location for each sub-path, and an end location for each sub-path.

At operation 620, neighbor nodes from the plurality of nodes may be determined for a current node of the plurality of nodes. Each neighbor node may be connected to the current node via a corresponding sub-path.

At operation 630, a corresponding time cost for traveling to each of the neighbor nodes via the corresponding sub-path may be estimated based on the corresponding historical traffic information at the estimated arrival time for the current node.

At operation 640, one of the neighbor nodes and the corresponding sub-path may be selected to be included in the optimal path.

At operation 650, the current node may be updated to be equal to the selected neighbor node.

At operation 660, it may be determined whether or not the current node is the destination node. If it is determined that the current node is the destination node, then the method 600 may come to an end. If it is determined that the current node is not the destination node, then then method may return to operation 620. In this fashion, the determining, estimating, selecting, and updating operations may be repeated until the current node equals the corresponding node of the destination geographical location. It is contemplated that any of the other features described within the present disclosure may be incorporated into method 600.

In some embodiments, a minimal cost search can be started from the source node. Two stacks, a stack of unvisited nodes and a stack of visited nodes, can be established to record all the nodes. All the nodes except the source node can be initialized as "unvisited." When a node $v_i$ is visited and guaranteed with its minimal cost $f_i$, the node can be marked as "visited." When a node is visited, it can be moved from the stack of unvisited nodes to the stack of visited nodes. In some embodiments, at each stage, only one node is moved. When destination node $v_N$ is moved into stack of visited nodes, the algorithm can be terminated.

The attributes of the stack of unvisited nodes can include, but are not limited to, a unique node ID for each node in the stack. The attributes of the stack of visited nodes can include, but are not limited to, a unique node ID for each node in the stack, a corresponding minimal cost from the source to each node in the stack; and a corresponding expected arrival time for each node in the stack.

Figure 7:
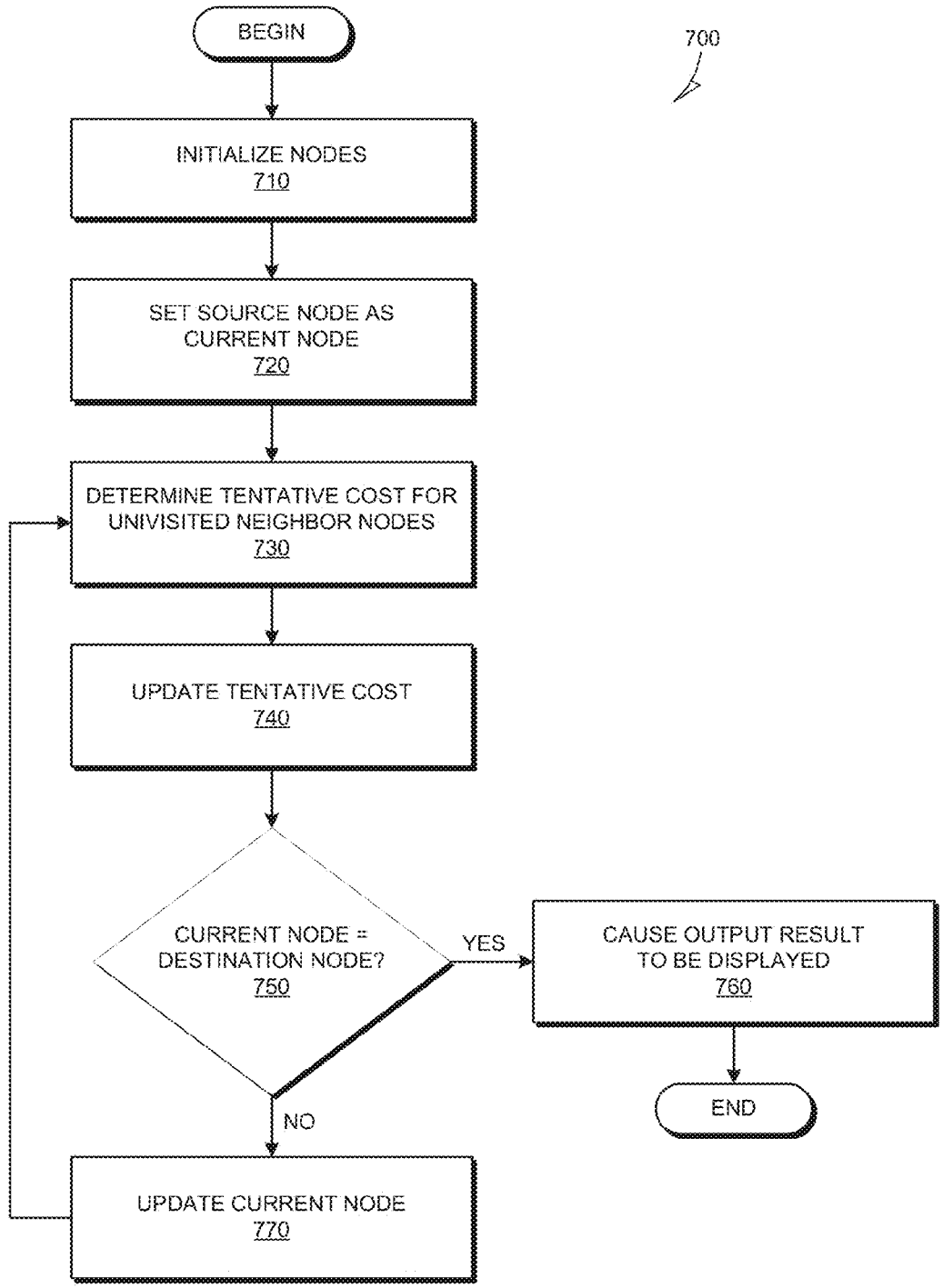
FIG. 7 is a flowchart illustrating a method of determining an optimal path, in accordance with an example embodiment.

FIG. 7 is a flowchart illustrating a method 700 of determining an optimal path, in accordance with an example embodiment. It is contemplated that the operations of method 700 may be performed by a system or modules of a system (e.g., dynamic path optimization module 410 in FIG. 4).

At operation 710, all of the nodes from the source node to the destination node may be initialized. In some embodiments, all of the nodes except the source node are initialized as "unvisited" and their corresponding minimal costs from the source $f_i$, i=2, 3, . . . , N are set to infinite.

At operation 720, the source node is initially set as the current node, and the timestamp on the current node is also assigned. The current node may be moved to the stack of visited nodes.

At operation 730, corresponding tentative costs for unvisited neighbor nodes of the current node may be determined. In some embodiments, according to the timestamp of the current node, time-based traffic information of the connected roads can be obtained. Therefore, the corresponding tentative cost for each of the unvisited neighbor nodes of the current node can be determined and set. The tentative cost can be evaluated as $f^t + c_{i,j,t}$, where i denotes the current codes, t denotes timestamp of the current node, and j denotes the unvisited neighbor node.

At operation 740, the new evaluated tentative cost for each unvisited neighbor node may be compared with the previously recorded tentative costs for the corresponding unvisited neighbor node, and the tentative cost for an unvisited neighbor node may be updated to equal the new evaluated tentative cost if the new evaluated tentative cost is less than the previously recorded tentative cost for the unvisited neighbor node. The expected arriving time may also be updated using the timestamp of the corresponding node.

At operation 750, it is determined whether the current node is the destination node. If it is determined that the current node is the destination node, then, at operation 760, an output result comprising details regarding the determined optimal path is caused to be displayed to a user. The optimal path may be defined by the nodes in the stack of visited nodes. The method 700 may then come to an end. If it is determined that the current node is not the destination node, then, at operation 770, the current node is updated. From the stack of unvisited nodes, a node with the smallest tentative cost may be selected as the current node. The tentative cost may be set as the minimal cost from the source node. The method 700 may then return to operation 730. The above processing of operations 730, 740, 750, and 770 may be iterated until the current node becomes the destination node. In each iteration, the current node can be selected based on the selected node having the smallest cost from the source node. In this way, costs of the neighbor nodes can be recalculated and updated.

It is contemplated that any of the other features described within the present disclosure may be incorporated into method 700.

One example of pseudo-code for method 700 is provided as follows:

```
1    Function Path_Opt(Graph, Traffic):
2        For each node v in Graph:
         % Initialization
3            f[v] = infinity;
4            Previous[v] = NULL;
5        End for
6        f[source] = 0 ;
         % Current node setting
7        Stack_of_Unvisited = the set of all nodes in Graph ;
8        Stack_of_visted = NULL;
9        While Current_Node != Destination
10           Current_Node = node in Stack_of_Unvisited with minimal
                 cost;
11           Update Current_Node.timestamp
12           Move Current_Node from Stack_of_Unvisited to
                 Stack_of_visted;
             % Tentative cost evaluation
13           For each neighbor node i of Current_Node:
14               Ten_cost[i] = f[Current_Node] + cost[Current_Node,
                     i, Current_Node.timestamp] % Cost is evaluated
                     according to formula (1)
                 % Tentative cost update
15               If Ten_cost[i] < f[i]
16                   f[i] = Ten_cost[i];
17                   Update i.timestamp
18                   previous[i] = Current_Node
19               End if
20           End for
21       End while
22       Return f;
23       Return Stack_of_visted;
24       Return Destination.timestamp
25   End
```

Figure 8A:
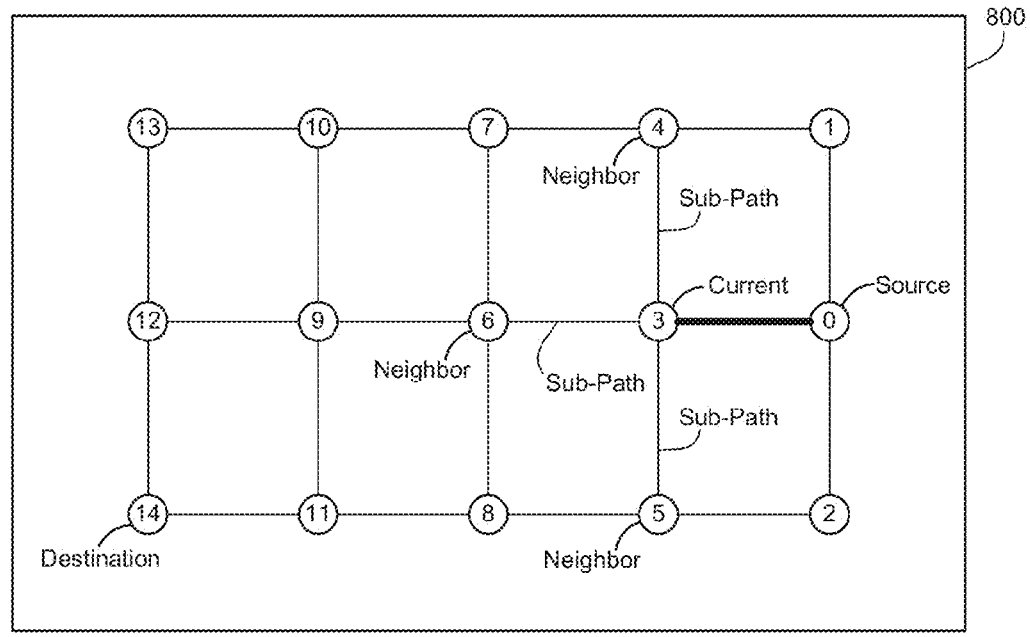
FIGS. 8A-8B illustrate a selection of a neighbor node and a corresponding sub-path, in accordance with an example embodiment.
Figure 8B:
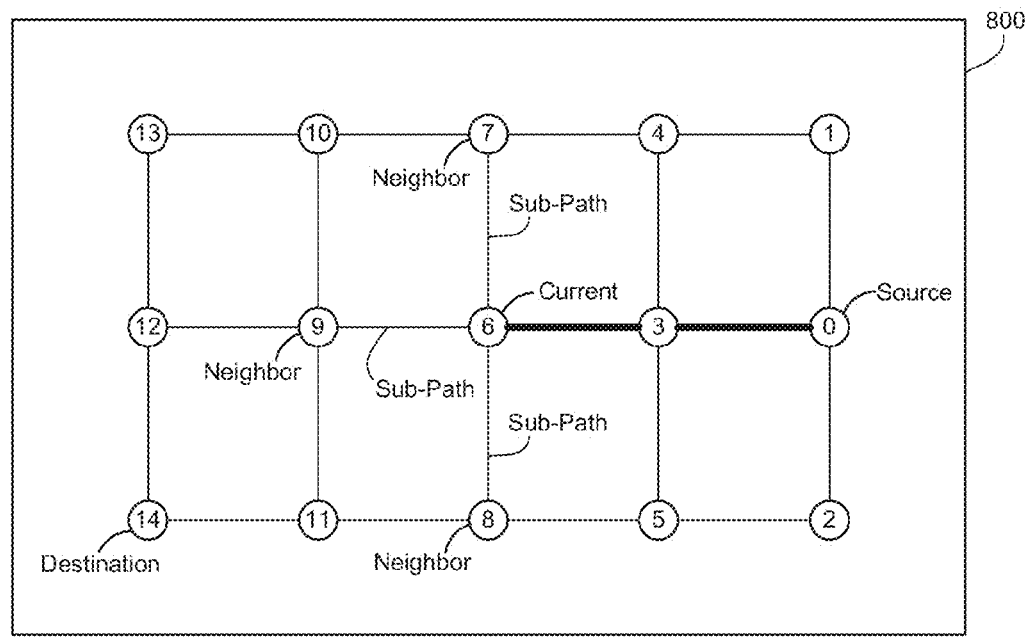

FIGS. 8A-8B illustrate a selection of a neighbor node and a corresponding sub-path, in accordance with an example embodiment. A graph 800 of nodes 0, 1, 2, 3, 4, 5, 6, 7, 8, 9, 10, 11, 12, 13, and 14 is shown. Node 0 is the source node, while node 14 is the destination node. Each one of the nodes can correspond to a geographical location. Additionally, each node may be connected directly to its neighbor nodes via a corresponding sub-path. Each sub-path may correspond to a road section. In this fashion, each node may represent a point where a decision may be made as to which sub-path to select for inclusion in an optimal path from the source node 0 to the destination node 14. It is noted that graph 800 in FIGS. 8A-8B comprises a simple configuration of nodes and sub-paths. It is contemplated that other configurations are within the scope of the present disclosure.

Beginning with the source node 0 as the current node, a corresponding time cost for traveling to each of the neighbor nodes of the current node via the corresponding sub-path may be estimated based on the corresponding historical traffic information at the estimated arrival time at the current node. One of the neighbor nodes and the corresponding sub-path to the neighbor node may then be selected to be included in the optimal path based on a preference for the lowest corresponding time cost. The current node may then be updated to be equal to the selected neighbor node.

In the example shown in FIG. 8A, it was determined that the estimated time cost for traveling from source node 0 to neighbor node 3 was lower than the estimated time cost for traveling from source node 0 to neighbor node 1 or to neighbor node 2. As a result, node 3 is shown in FIG. 8A as being the current node. Additionally, the sub-path from source node 0 to node 3 has been made bold to reflect the path to selected node 3.

Since node 3 is the current node in FIG. 8A, the neighbor nodes under consideration for being the next node to be selected for the optimal path are nodes 4, 5, and 6, as they are each directly connected to current node 3 by a single sub-path and have not yet been visited. The corresponding time costs for traveling from current node 3 to unvisited neighbor nodes 4, 5, and 6, are then estimated using historical traffic information (and, optionally, other factors as well), as discussed above.

The node with the lowest estimated time cost is then selected for inclusion in the optimal path and is assigned as the current node. In the example shown in FIG. 8B, node 6 is the neighbor node with the lowest estimated time cost. Accordingly, it is selected for inclusion in the optimal path and assigned as the current node. As a result, the next set of neighbor nodes under consideration for being the next node selected for the optimal path are nodes 7, 8, and 9, as they are directly connected to current node 6 by a single sub-path and have not yet been visited. The time cost estimation and node selection is repeated until the destination node becomes the current node.

The present disclosure provides path optimization techniques. Dynamic traffic information can be included in the path optimization process, where, not only distance, but also traffic flow, traffic restriction, speed restriction and other factors can be considered in determining an optimal path.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 214 of FIG. 2) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
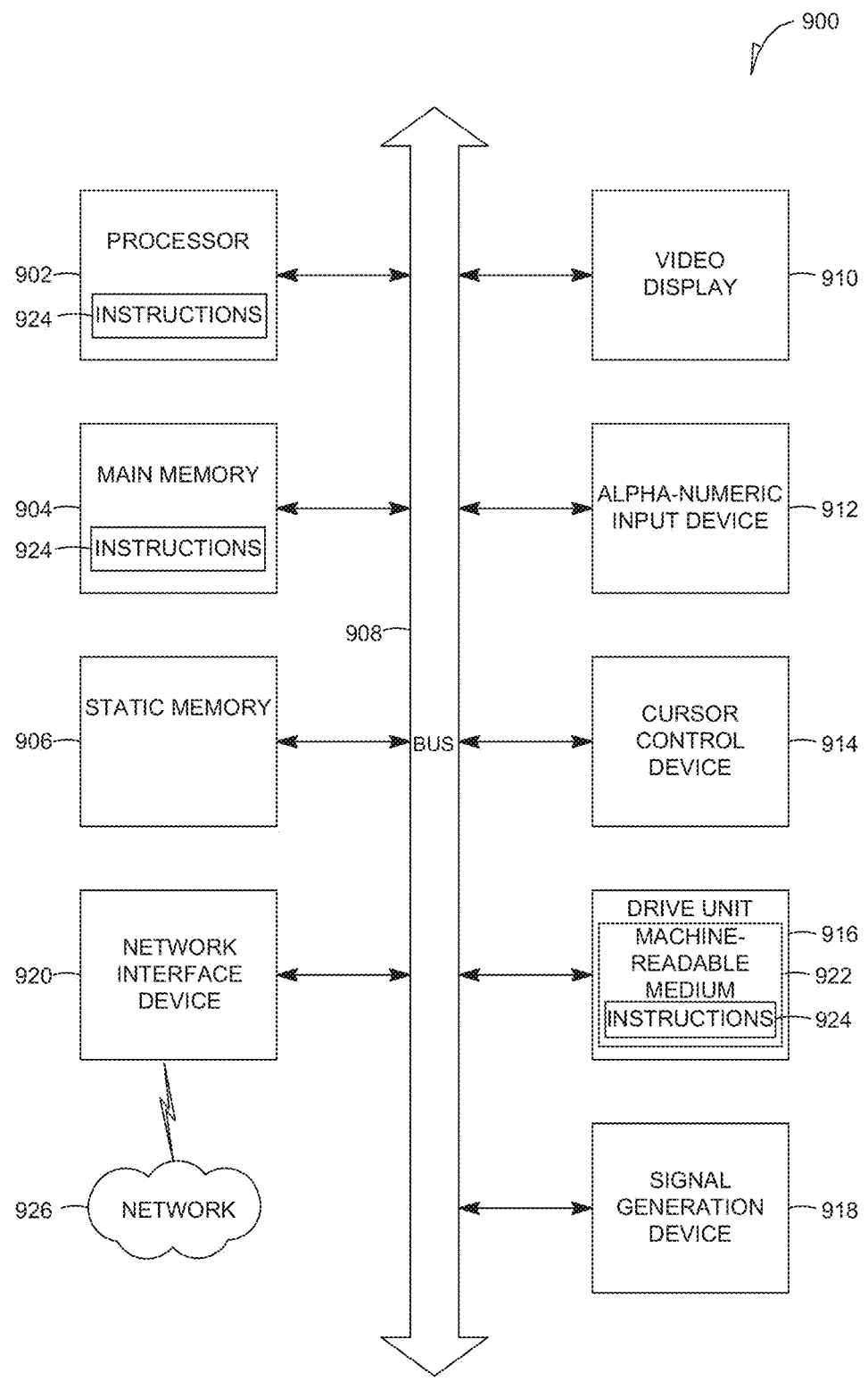
FIG. 9 is a block diagram of an example computer system on which methodologies described herein may be executed, in accordance with an example embodiment.

FIG. 9 is a block diagram of a machine in the example form of a computer system 900 within which instructions 924 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   receiving an instruction to determine an optimal path from a source geographical location to a destination geographical location;
   determining, by a machine having a memory and at least one processor, an optimal path from the source geographical location to the destination geographical location using corresponding historical traffic information for each one of a plurality of sub-paths, the historical traffic information for each sub-path corresponding to an estimated arrival time at a start location for the corresponding sub-path and being used to select sub-paths from the plurality of sub-paths, the selected sub-paths defining the optimal path, the determining the optimal path comprising:
      associating each one of a plurality of nodes with a corresponding one of a plurality of geographical locations, the plurality of geographical locations comprising the source geographical location, the destination geographical location, a start location for each sub-path, and an end location for each sub-path;
      determining neighbor nodes from the plurality of nodes for a current node of the plurality of nodes, each neighbor node being connected to the current node via a corresponding sub-path;
      estimating a corresponding time cost for traveling to each of the neighbor nodes via the corresponding sub-path based on the corresponding historical traffic information at the estimated arrival time for the current node;
      selecting one of the neighbor nodes and the corresponding sub-path to be included in the optimal path;
      updating the current node to be equal to the selected neighbor node; and
      repeating the determining neighbor nodes, estimating, selecting, and updating steps until the current node equals the corresponding node of the destination geographical location; and
   causing information about the optimal path to be displayed to a user on a device.

2. The method of claim 1, wherein the historical traffic information comprises an indication of traffic flow for the corresponding sub-path.

3. The method of claim 2, wherein the indication of traffic flow comprises an average speed of traffic flow.

4. The method of claim 2, wherein the historical traffic information further comprises an indication of availability for the corresponding sub-path.

5. The method of claim 1, wherein each selected sub-path is selected based on a preference to minimize travel time.

6. The method of claim 1, wherein the information about the optimal path comprises at least one of a time cost for the optimal path, an estimated arrival time at the destination geographical location using the optimal path, and the selected sub-paths for the optimal path.

7. A system comprising:
   a machine having a memory and at least one processor; and
   a dynamic path optimization module on the machine, the dynamic path optimization module being configured to:
      receive an instruction to determine an optimal path from a source geographical location to a destination geographical location;
      determine an optimal path from the source geographical location to the destination geographical location using corresponding historical traffic information for each one of a plurality of sub-paths, the historical traffic information for each sub-path corresponding to an estimated arrival time at a start location for the corresponding sub-path and being used to select sub-paths from the plurality of sub-paths, the selected sub-paths defining the optimal path, the determining the optimal path comprising:
         associating each one of a plurality of nodes with a corresponding one of a plurality of geographical locations, the plurality of geographical locations comprising the source geographical location, the destination geographical location, a start location for each sub-path, and an end location for each sub-path;
         determining neighbor nodes from the plurality of nodes for a current node of the plurality of nodes, each neighbor node being connected to the current node via a corresponding sub-path;
         estimating a corresponding time cost for traveling to each of the neighbor nodes via the corresponding sub-path based on the corresponding historical traffic information at the estimated arrival time for the current node;
         selecting one of the neighbor nodes and the corresponding sub-path to be included in the optimal path;
         updating the current node to be equal to the selected neighbor node; and
         repeating the determining neighbor nodes, estimating, selecting, and updating steps until the current node equals the corresponding node of the destination geographical location; and
      cause information about the optimal path to be displayed to a user on a device.

8. The system of claim 7, wherein the historical traffic information comprises an indication of traffic flow for the corresponding sub-path.

9. The system of claim 8, wherein the indication of traffic flow comprises an average speed of traffic flow.

10. The system of claim 8, wherein the historical traffic information further comprises an indication of availability for the corresponding sub-path.

11. The system of claim 7, wherein the dynamic path optimization module is configured to select sub-paths based on a preference to minimize travel time.

12. The system of claim 7, wherein the information about the optimal path comprises at least one of a time cost for the optimal path, an estimated arrival time at the destination geographical location using the optimal path, and the selected sub-paths for the optimal path.

13. A non-transitory machine-readable storage device, tangibly embodying a set of instructions that, when executed by at least one processor, causes the at least one processor to perform a set of operations comprising:

receiving an instruction to determine an optimal path from a source geographical location to a destination geographical location;

determining an optimal path from the source geographical location to the destination geographical location using corresponding historical traffic information for each one of a plurality of sub-paths, the historical traffic information for each sub-path corresponding to an estimated arrival time at a start location for the corresponding sub-path and being used to select sub-paths from the plurality of sub-paths, the selected sub-paths defining the optimal path, the determining the optimal path comprising:

associating each one of a plurality of nodes with a corresponding one of a plurality of geographical locations, the plurality of geographical locations comprising the source geographical location, the destination geographical location, a start location for each sub-path, and an end location for each sub-path;

determining neighbor nodes from the plurality of nodes for a current node of the plurality of nodes, each neighbor node being connected to the current node via a corresponding sub-path;

estimating a corresponding time cost for traveling to each of the neighbor nodes via the corresponding sub-path based on the corresponding historical traffic information at the estimated arrival time for the current node;

selecting one of the neighbor nodes and the corresponding sub-path to be included in the optimal path;

updating the current node to be equal to the selected neighbor node; and repeating the determining, estimating, selecting, and updating steps until the current node equals the corresponding node of the destination geographical location; and causing information about the optimal path to be displayed to a user on a device.

14. The non-transitory machine-readable storage device of claim 13, wherein the historical traffic information comprises an indication of traffic flow for the corresponding sub-path.

15. The non-transitory machine-readable storage device of claim 13, wherein each selected sub-path is selected based on a preference to minimize travel time.

\* \* \* \* \*